United States Patent
Nakamura

(10) Patent No.: US 10,194,038 B2
(45) Date of Patent: Jan. 29, 2019

(54) INFORMATION PROCESSING APPARATUS, INFORMATION PROCESSING METHOD, AND INFORMATION PROCESSING SYSTEM

(71) Applicant: Aoi Nakamura, Kanagawa (JP)

(72) Inventor: Aoi Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/699,420

(22) Filed: Sep. 8, 2017

(65) Prior Publication Data

US 2018/0077303 A1 Mar. 15, 2018

(30) Foreign Application Priority Data

Sep. 15, 2016 (JP) .................. 2016-180200
Nov. 24, 2016 (JP) .................. 2016-227718

(51) Int. Cl.
*H04N 1/00* (2006.01)
*G06F 3/12* (2006.01)

(52) U.S. Cl.
CPC ....... *H04N 1/00411* (2013.01); *G06F 3/1203* (2013.01); *G06F 3/1254* (2013.01); *G06F 3/1272* (2013.01); *G06F 3/1285* (2013.01); *H04N 1/00482* (2013.01)

(58) Field of Classification Search
CPC ................................. H04N 1/00411
See application file for complete search history.

(56) References Cited

U.S. PATENT DOCUMENTS

| | | | |
|---|---|---|---|
| 9,442,678 B2* | 9/2016 | Kobayashi | G06F 3/1205 |
| 2003/0169444 A1* | 9/2003 | Kemp | G06F 3/1204 358/1.15 |
| 2004/0012635 A1* | 1/2004 | Imai | G03G 15/5016 715/771 |
| 2004/0174404 A1* | 9/2004 | Itagaki | G03G 15/50 347/15 |
| 2007/0035564 A1* | 2/2007 | Katsuyama | H04N 1/00408 345/649 |
| 2008/0180730 A1* | 7/2008 | Shim | G06F 3/1205 358/1.15 |
| 2008/0295115 A1* | 11/2008 | Kimoto | H04N 1/00233 719/321 |
| 2008/0309974 A1* | 12/2008 | Shimazaki | G06F 3/1207 358/1.15 |

(Continued)

FOREIGN PATENT DOCUMENTS

JP 2010-066876 3/2010

*Primary Examiner* — Ted W Barnes
(74) *Attorney, Agent, or Firm* — IPUSA, PLLC

(57) ABSTRACT

An information processing apparatus includes a processor, in communication with a memory, executing a process including displaying, on a display device, a screen displaying information relating to a print request, in response to the print request received from an application, the print request being given in response to an operation input to the application via a user interface; and displaying a report indicating switching to the screen displaying the information relating to the print request, in a status where a screen displayed by the application is displayed in front of and hiding the screen displaying the information relating to the print request, the report being displayed in front of the screen displayed by the application.

6 Claims, 16 Drawing Sheets

(56) References Cited

U.S. PATENT DOCUMENTS

| | | | | |
|---|---|---|---|---|
| 2009/0040546 A1* | 2/2009 | Hirakawa | G06K 15/00 | 358/1.14 |
| 2009/0268237 A1* | 10/2009 | Miyata | H04N 1/00962 | 358/1.15 |
| 2010/0128309 A1* | 5/2010 | Matoba | G06K 15/005 | 358/1.15 |
| 2011/0002001 A1* | 1/2011 | Tokura | G06F 3/1207 | 358/1.14 |
| 2011/0299126 A1* | 12/2011 | Nakata | G06F 3/1204 | 358/1.15 |
| 2013/0050751 A1* | 2/2013 | Fukushima | H04N 1/00222 | 358/1.15 |
| 2013/0094056 A1* | 4/2013 | Kobayashi | G06F 3/1208 | 358/1.15 |
| 2013/0135672 A1* | 5/2013 | Watanabe | G06F 3/12 | 358/1.15 |
| 2013/0182286 A1* | 7/2013 | Tarumi | G06K 15/02 | 358/1.15 |
| 2013/0229370 A1* | 9/2013 | Shimizu | G06F 3/048 | 345/173 |
| 2013/0242348 A1* | 9/2013 | Tamashima | H04N 1/21 | 358/1.16 |
| 2013/0250331 A1* | 9/2013 | Kobayashi | G06F 3/1205 | 358/1.13 |
| 2013/0335768 A1* | 12/2013 | Kujirai | G06F 21/608 | 358/1.13 |
| 2014/0078536 A1* | 3/2014 | Hamamoto | H04N 1/00411 | 358/1.13 |
| 2014/0078548 A1* | 3/2014 | Kikuchi | G06F 3/1203 | 358/1.15 |
| 2014/0198343 A1* | 7/2014 | Cho | G06F 3/1205 | 358/1.15 |
| 2014/0285826 A1* | 9/2014 | Sato | G06F 3/1292 | 358/1.6 |
| 2014/0293312 A1* | 10/2014 | Fukasawa | G06K 15/1806 | 358/1.13 |
| 2014/0320879 A1* | 10/2014 | Yagi | G06F 3/1204 | 358/1.13 |
| 2014/0362409 A1* | 12/2014 | Kikuchi | G06F 3/1222 | 358/1.15 |
| 2015/0002883 A1* | 1/2015 | Hibi | G06K 15/4065 | 358/1.14 |
| 2015/0170012 A1* | 6/2015 | Iwasawa | G06K 15/4065 | 358/1.12 |
| 2015/0242712 A1* | 8/2015 | Awano | G06K 15/002 | 358/1.15 |
| 2015/0256705 A1* | 9/2015 | Onoda | H04L 51/18 | 358/1.15 |
| 2015/0324157 A1* | 11/2015 | Harada | G06F 3/1258 | 358/1.15 |
| 2016/0077777 A1* | 3/2016 | Kobayashi | G06F 3/1205 | 358/1.15 |
| 2016/0094737 A1* | 3/2016 | Sugiura | H04N 1/00432 | 358/1.15 |
| 2016/0162235 A1* | 6/2016 | Saigusa | G06F 3/1205 | 358/1.15 |
| 2016/0219156 A1* | 7/2016 | Sato | H04N 1/00037 | |
| 2017/0070625 A1* | 3/2017 | Yee | H04N 1/00517 | |
| 2017/0187895 A1* | 6/2017 | Yamanishi | H04N 1/00209 | |
| 2017/0235530 A1* | 8/2017 | Nakamura | G06F 3/1245 | 358/1.13 |

* cited by examiner

INFORMATION PROCESSING APPARATUS, INFORMATION PROCESSING METHOD, AND INFORMATION PROCESSING SYSTEM

CROSS-REFERENCE TO RELATED APPLICATION

The present application claims priority under 35 U.S.C. § 119 to Japanese Patent Application No. 2016-180200, filed on Sep. 15, 2016, and Japanese Patent Application No. 2016-227718, filed on Nov. 24, 2016, the contents of which are incorporated herein by reference in their entirety.

BACKGROUND OF THE INVENTION

1. Field of the Invention

The present invention relates to an information processing apparatus, an information processing method, and an information processing system.

2. Description of the Related Art

In the Operating System (OS) on Windows from Windows (registered trademark) 2000 to Windows 7 of the related art, an architecture referred to as Version 3 is adopted as the architecture of the printer driver.

In this printer driver of Version 3, there is a known technique of displaying a dialogue after the user presses a "print" button, accepting a setting of a password, etc., from the user, and displaying a print preview screen. Accordingly, for example, it is possible to display a screen that is to be displayed every time a printing process is performed, such as a setting screen of a password and the destination of fax transmission, and a print preview screen including the result of a rendering process using the printer driver.

In the OS on and subsequent to Windows 8, in addition to Version 3, an architecture of a printer driver referred to as Version 4 has been adopted, and a mechanism of a new application referred to as Windows store application (hereinafter also referred to as "store application") has been introduced.

Patent Document 1: Japanese Unexamined Patent Application Publication No. 2010-066876

SUMMARY OF THE INVENTION

An aspect of the present invention provides an information processing apparatus, an information processing method, and an information processing system, in which one or more of the disadvantages of the related art are reduced.

According to one aspect of the present invention, there is provided an information processing apparatus including a processor, in communication with a memory, executing a process including displaying, on a display device, a screen displaying information relating to a print request, in response to the print request received from an application, the print request being given in response to an operation input to the application via a user interface; and displaying a report indicating switching to the screen displaying the information relating to the print request, in a status where a screen displayed by the application is displayed in front of and hiding the screen displaying the information relating to the print request, the report being displayed in front of the screen displayed by the application.

BRIEF DESCRIPTION OF THE DRAWINGS

FIG. 7 is a diagram illustrating an example of a print setting screen displayed by a store device application;

FIG. 11 is a diagram illustrating an example of a print setting screen used when setting a destination and a password, etc., according to the first embodiment of the present invention;

DETAILED DESCRIPTION OF THE PREFERRED EMBODIMENTS

In the store application of the related art, when a "print" button is pressed by the user, a print-use process for performing a printing process using the printer driver of Version 4 is activated separately from the process of the store application, and the printing process is executed. The screen displayed by this print-use process is not displayed in front of the screen displayed by the process of the store application, due to a restriction applied by the OS. Therefore, there is a problem that after the "print" button is pressed by the user, the screen of the print-use process cannot be displayed to the user.

A problem to be solved by an embodiment of the present invention is to provide a technique of reporting, to the user, of the existence of a screen for accepting settings related to printing, after an operation for executing printing is performed by the user at an application.

In the following, embodiments of the present disclosure are described in detail by referring to the accompanying drawings.

<System Configuration>

Figure 1:
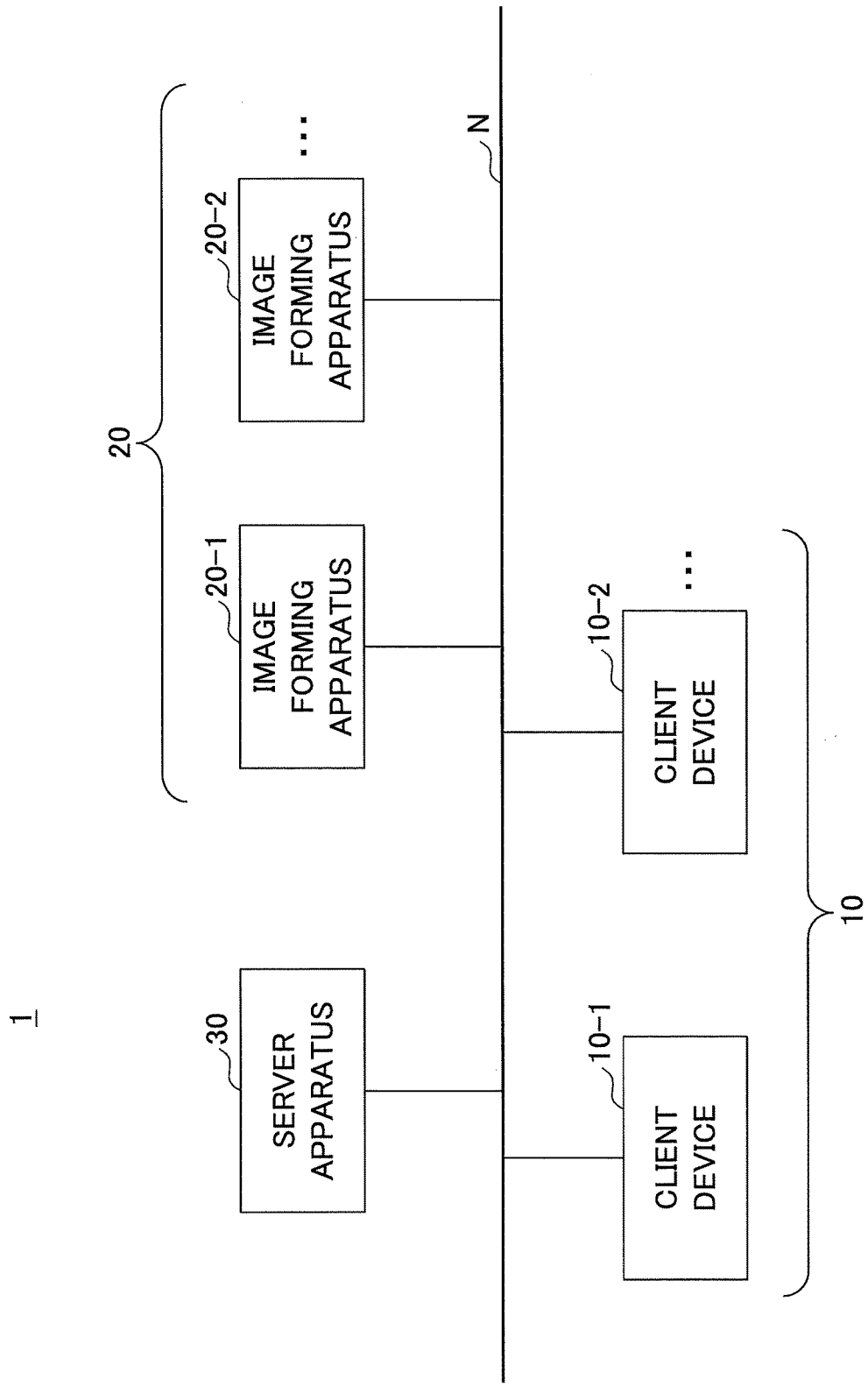
FIG. 1 is a diagram illustrating a system configuration of an example of an information processing system according to an embodiment of the present invention.

First, a system configuration of an information processing system 1 according to an embodiment is described by referring to FIG. 1. FIG. 1 is a diagram illustrating a system configuration of an example of the information processing system 1 according to the embodiment.

As illustrated in FIG. 1, the information processing system 1 according to the embodiment includes one or more client devices 10; one or more image forming apparatuses 20; and a server apparatus 30. These devices are coupled to each other through a network N, such as a local area network (Local Area Network), so that these devices can communicate each other.

The client device 10 may be, for example, a personal computer (PC), a smartphone, or a tablet terminal. Upon receiving, for example, a print instruction from a user, the client device 10 creates print data from data to be printed (print target data), and the client device 10 transmits the print data to the image forming apparatus 20. Alternatively, upon receiving, for example, a print instruction from a user, the client device 10 transmits print target data to the server apparatus 30.

Note that the print target data is, for example, printable electronic data, such as image data and document data. Furthermore, the print data is, for example, electronic data obtained by converting the print target data into data in a Page Description Language (PDL) format that can be printed by the image forming apparatus 20.

The image forming apparatus 20 is, for example, a printer or a Multifunction Peripheral (MFP) with a printing function. The image forming apparatus 20 prints the print data received from the client device 10 or the server apparatus 30.

The server apparatus 30 is, for example, a personal computer (PC). For example, the server apparatus 30 creates print data from print target data received from the client device 10, and the server apparatus 30 transmits the created print data to the image forming apparatus 20.

The server apparatus 30 may also function as a file server. Namely, the server apparatus 30 may store, for example, print data received from the client device 10, and, upon receiving a request from the image forming apparatus 20, the server apparatus 30 may transmit the stored print data to the requesting image forming apparatus 20.

Note that, in the following descriptions, when the one or more client devices 10 are to be distinguished from each other, the one or more client devices 10 may be denoted as "client device 10-1" and "client device 10-2," for example. Similarly, when the one or more image forming apparatuses 20 are to be distinguished from each other, the one or more image forming apparatuses 20 may be denoted as "image forming apparatus 20-1" and "image forming apparatus 20-2," for example.

<Hardware Configuration>

Figure 2:
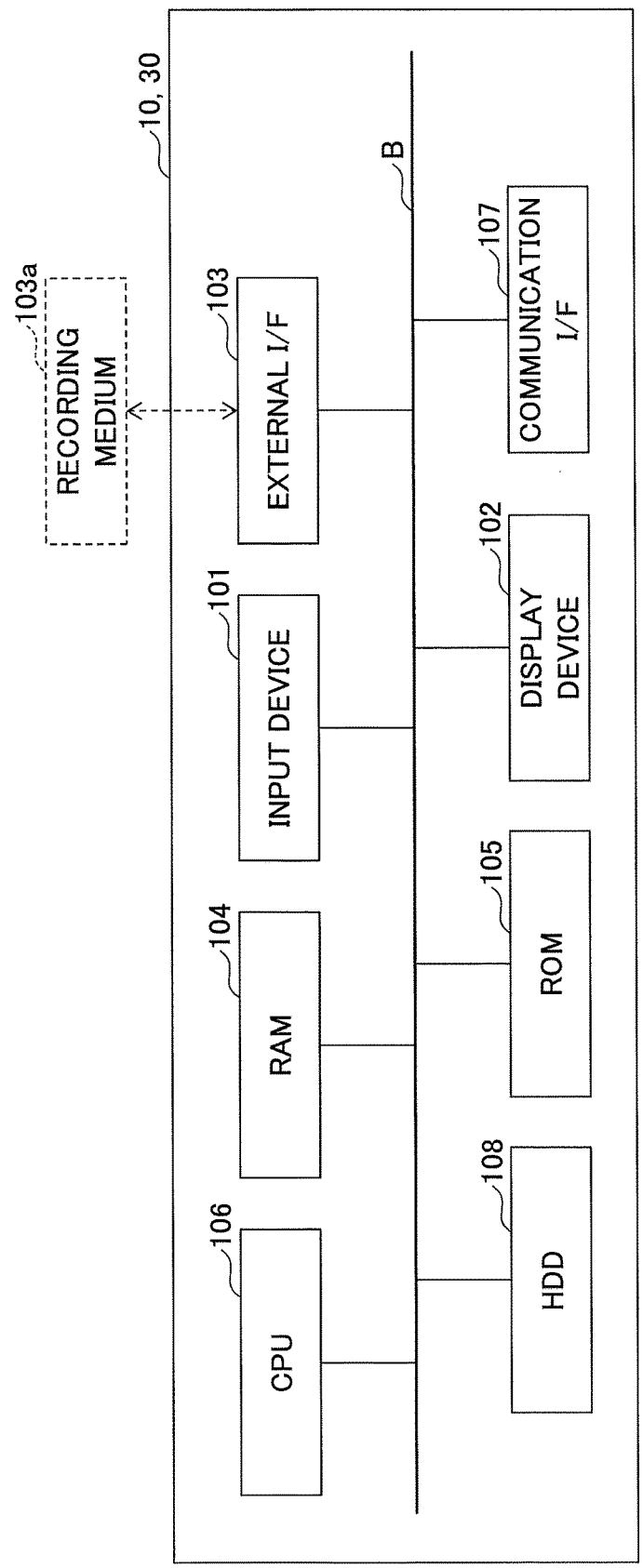
FIG. 2 is a diagram illustrating a hardware configuration of an example of each of a client device and a server apparatus according to an embodiment of the present invention.
Figure 3:
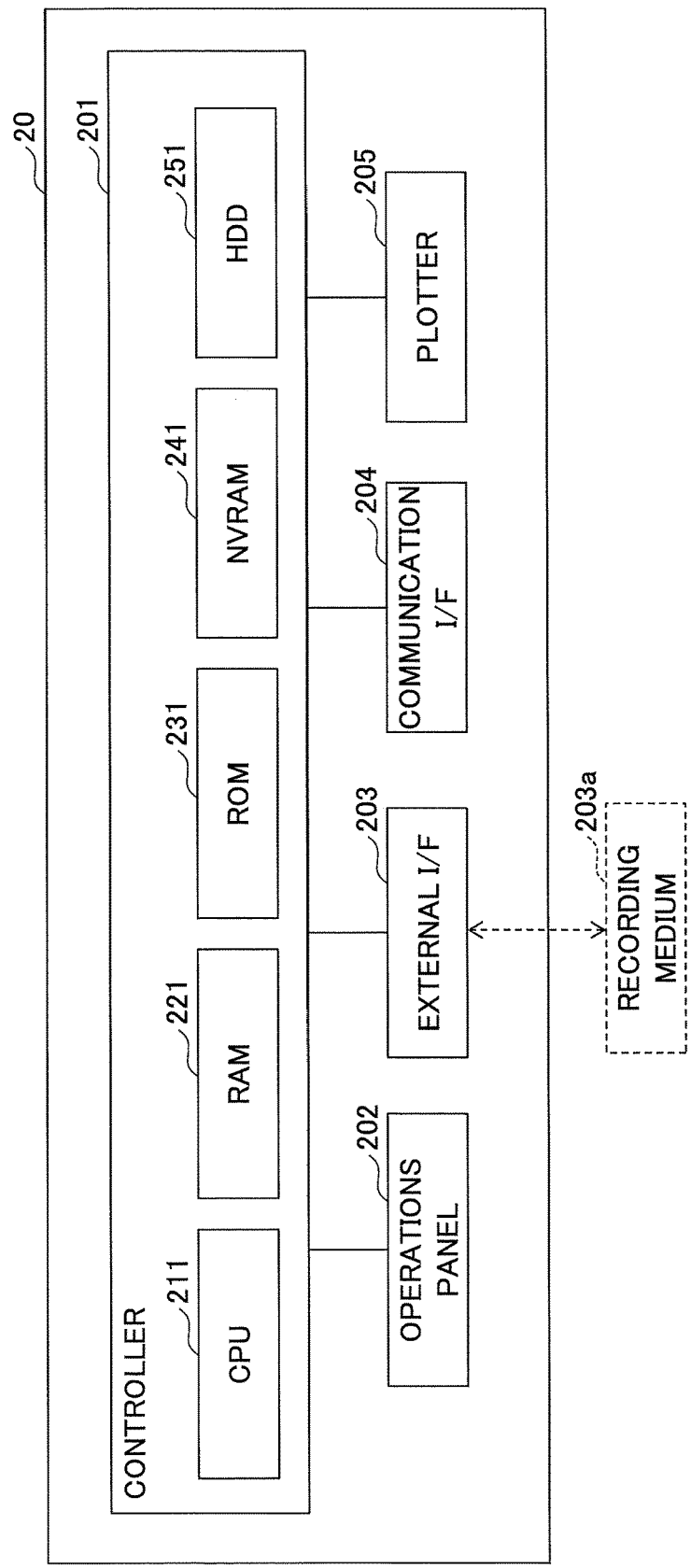
FIG. 3 is a diagram illustrating a hardware configuration of an example of an image forming apparatus according to an embodiment of the present invention.

Next, hardware configurations of the client device 10, the image forming apparatus 20, and the server apparatus 30 that are included in the information processing system 1 according to the embodiment are described by referring to FIG. 2 and FIG. 3.

<<The Client Device 10 and the Server Apparatus 30>>

FIG. 2 is a diagram illustrating hardware configurations of examples of the client device 10 and the server apparatus 30 according to the embodiment. Note that the client device 10 and the server apparatus 30 have similar hardware configurations. Thus, in the following, the hardware configuration of the client device 10 is described.

As illustrated in FIG. 2, the client device 10 according to the embodiment includes an input device 101; a display device 102; an external I/F 103; and a Random Access Memory (RAM) 104. Furthermore, the client device 10 includes a Read Only Memory (ROM) 105; a Central Processing Unit (CPU) 106; a communication I/F 107; and a Hard Disk Drive (HDD) 108. These hardware components are coupled to each other through a bus B.

The input device 101 includes a keyboard, a mouse, and a touch panel; and the input device 101 is used by a user to input various operation signals. The display device 102 includes a display. The display device 102 displays a processing result by the client device 10. Note that at least one of the input device 101 and the display device 102 may be configured such that it is coupled to the client device 10 so as to be used when it is necessary.

The communication I/F 107 is an interface for coupling the client device 10 to the network N. The client device 10 can perform communication through the communication I/F 107.

The HDD 108 is a non-volatile storage device for storing a program and data. As the program and the data stored in the HDD 108, there are an Operating System (OS) that is a system software for controlling the entire client device 10 and an application software that provides various types of functions on the OS.

Note that, instead of the HDD 108, the client device 10 may include a drive device (e.g., a solid state drive (SSD)) that uses a flash memory as the storage medium. Furthermore, the HDD 108 manages the stored program and data by a predetermined file system or a database (DB).

The external I/F 103 is an interface with an external device. The external device includes a recording medium 103a. The client device 10 can read data from and write data in the recording medium 103a through the external I/F 103. Examples of the recording medium 103a include a flexible disk, a Compact Disk (CD), a Digital Versatile Disk (DVD), a SD memory card, and a Universal Serial Bus (USB) memory.

The ROM 105 is a non-volatile semiconductor memory that can maintain a program and data, even if a power source is turned off. The ROM 105 stores an OS setting; a program and data, such as network setting; and a Basic Input/Output System (BIOS) that is executed for activating the client device 10. The RAM 104 is a volatile semiconductor memory for temporarily storing a program and data.

The CPU 106 is a processor that performs control of the entire client device 10 and that implements other functions of the client device 10 by reading out a program and data from a storage device, such as the ROM 105 and the HDD 108, onto the RAM 104, and executing a process based on the program and the data.

Each of the client device 10 and the server apparatus 30 according to the embodiment is provided with the hardware configuration illustrated in FIG. 2, so that various types of processes, which are described below, can be implemented.

<<The Image Forming Apparatus 20>>

FIG. 3 is a diagram illustrating a hardware configuration of an example of the image forming apparatus 20 according to the embodiment.

As illustrated in FIG. 3, the image forming apparatus 20 according to the embodiment includes a controller 201; an operations panel 202; an external interface (I/F) 203; a communication I/F 204; and a plotter 205. Furthermore, the controller 201 includes a Central Processing Unit (CPU) 211; a Random-Access Memory (RAM) 221; a Read-Only Memory (ROM) 231; a Non-Volatile RAM (NVRAM) 241; and a Hard Disk Drive (HDD) 251.

The ROM 231 is a non-volatile semiconductor memory storing various types of programs and data. The RAM 221 is a volatile semiconductor memory that temporarily stores a program and data. The NVRAM 241 stores, for example, setting information. Furthermore, the HDD 251 is a non-volatile storage device that stores various types of programs and data.

The CPU 211 is a processor that implements overall control and other functions of the image forming apparatus 20 by reading out a program, data, setting information, etc., from the ROM 231, the NVRAM 241, and/or the HDD 251 onto the RAM 221 and executing a process based on the program and the data.

The operations panel 202 includes an input unit that receives an input from a user and a display unit that performs display. The external I/F 203 is an interface with an external device. As an example of the external device, there is a recording medium 203a. The image forming apparatus 20 is capable of performing reading out data from and writing data in the recording medium 203a through the external I/F 203. Examples of the recording medium 203a include an IC card, a flexible disk, a Compact Disk (CD), a Digital Versatile Disk (DVD), a Secure Digital (SD) memory card, and a Universal Serial Bus (USB) memory.

The communication I/F 204 is an interface for coupling the image forming apparatus 20 to a network N. The image forming apparatus 20 is capable of communicating through the communication I/F 204. The plotter 205 is a printer for printing print data.

The image forming apparatus 20 according to the embodiment is provided with a hardware configuration illustrated in FIG. 3, so that the image forming apparatus 20 is capable of executing various types of processes described below.

<Software Configuration of the Client Device 10>

Figure 4:
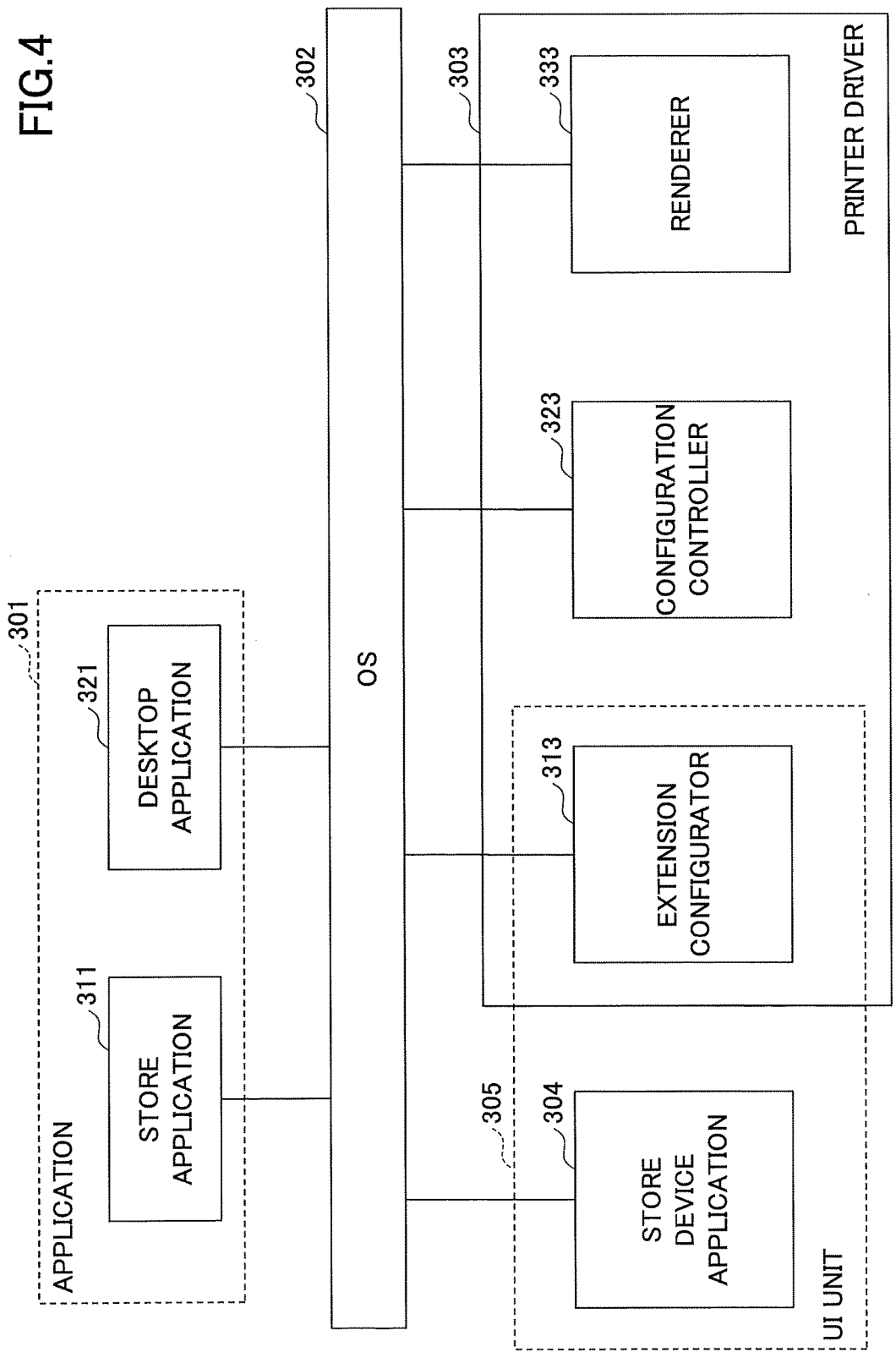
FIG. 4 is a diagram illustrating a software configuration of an example of the client device according to an embodiment of the present invention.

In the following, the software configuration of the client device 10 according to the embodiment is described by referring to FIG. 4. FIG. 4 is a diagram illustrating a software configuration of an example of the client device 10.

As illustrated in FIG. 4, the client device 10 according to the embodiment includes an application 301; an Operating System (OS) 302; a printer driver 303; and a store device application 304.

The application 301 is application software, such as document creation software, image browsing/editing software, and a browser, that is capable of indicating the OS 302 to print, in response to receiving a print instruction from a user. The application 301 includes a store application 311 and a desktop application 321.

The store application 311 is, for example, an application that is available from "Windows Store" that provides applications to Windows (registered trademark) 8/Windows RT and Windows OSs on and subsequent to Windows 8/Windows RT. In the store application 311, a store application User Interface (UI) is used. Note that, in Windows 8 and Windows 8.1, the store application 311 is invoked through a UI provided by the OS 302, which is referred to as "Modern UI" or "Metro UI."

The desktop application 321 is, for example, an application that can be used with an Windows OS on and prior to Windows 7.

The OS 302 is one of the Windows OSs on and subsequent to Windows 8/Windows RT.

The printer driver 303 is, for example, a Version 4 printer driver (which is denoted as "V4 printer driver," hereinafter). A V4 printer driver is based on an architecture adopted from Windows 8/Windows RT. In the following, the printer driver 303 may also be denoted as "V4 printer driver 303."

Note that, in Windows OS on and subsequent to Windows 8, the V4 printer driver can be used, in addition to the Version 3 printer driver (which is denoted as "V3 printer driver," hereinafter), which has been used from Windows 2000 through Windows 7.

The printer driver 303 includes an extension configurator 313; a configuration controller 323; and a renderer 333.

The extension configurator 313 may also be referred to as a printer extension. In response to detecting that the desktop application 321 executes printing, the extension configurator 313 displays a print setting screen specific to a vendor.

The configuration controller 323 may also be referred to as a line-breaking script. For example, the configuration controller 323 verifies whether a combination of print configurations is valid. For example, the extension configurator 313 may hide a combination of print configurations that are unverified by the configuration controller 323.

In response to receiving a request from the application 301 or the OS 302, the configuration controller 323 returns PrintCapability that indicates information about a function that can be configured by the printer driver 303. Furthermore, in response to receiving a request from the application 301 or the OS 302, the configuration controller 323 retrieves, from DevmodePropertyBag, configuration values of respective functions configured in the printer driver 303, and the configuration controller 323 returns PrintTicket indicating the retrieved configuration values. Additionally, the configuration controller 323 stores the configuration values indicated by PrintTicket in DevmodePropertyBag.

Note that PrintCapability and PrintTicket returned to the OS 302 are used, for example, for displaying current values of respective functions and choices in the print setting screen displayed by the extension configurator 313.

In response to detecting, by the application 301, that a print instruction for printing the print target data is received, the renderer 333 creates print data from the print target data.

Upon detecting that the store application 311 is to perform printing, the store device application 304 displays a print setting screen specific to a vendor. Note that, similar to the store application 311, the store device application 304 is available from "Windows store".

Upon detecting that the desktop application 321 is to perform printing, the printer driver 303 may create print data based on the details of the configuration that are made in the print setting screen displayed by the extension configurator 313. In contrast, upon detecting that the store application 311 is to perform printing, the printer driver 303 may create print data based on the details of the configuration that are made in the print setting screen displayed by the store device application 304.

The extension configurator 313 and the store device application 304 form a UI unit 305 for displaying a print setting screen specific to a vendor.

<Storage Area that can be Accessed by the V4 Printer Driver 303 and the Store Device Application 304>

Figure 5:
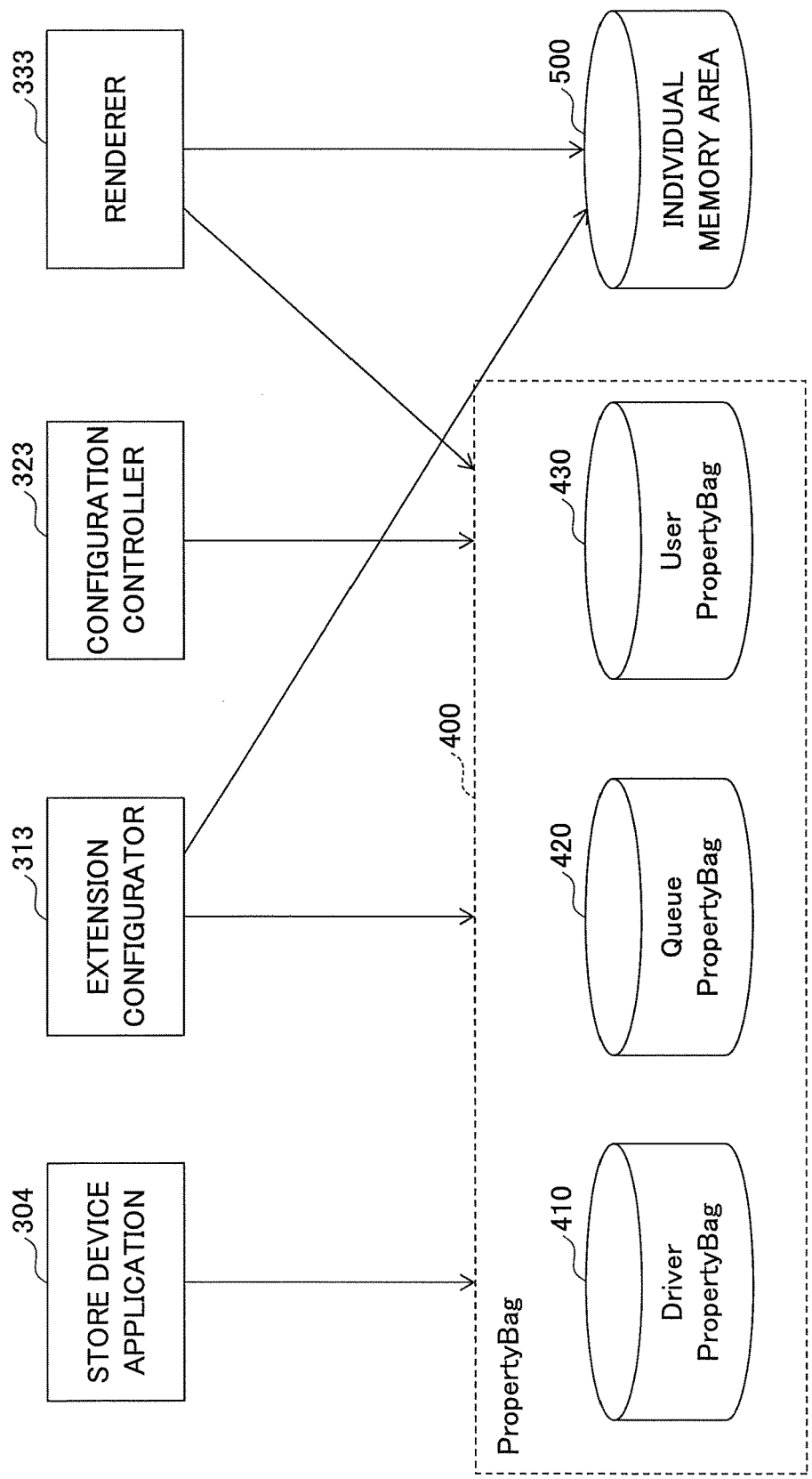
FIG. 5 is a diagram illustrating a storage area accessible by a V4 printer driver and a store device application according to an embodiment of the present invention.

Next, a storage area that can be accessed by the V4 printer driver 303 and the store device application 304 is described by referring to FIG. 5. FIG. 5 is a diagram illustrating the storage area that can be accessed by the V4 printer driver 303 and the store device application 304.

As illustrated in FIG. 5, the extension configurator 313, the configuration controller 323, the renderer 333, and the store device application 304 can access a storage area that is referred to as PropertyBag 400. Note that, such access to the storage area can be executed using an Application Programming Interface (API) provided by the OS 302.

As illustrated in FIG. 5, the PropertyBag 400 includes a DriverPropertyBag 410; a QueuePropertyBag 420; and a UserPropertyBag 430.

The DriverPropertyBag 410 is a storage area for storing setting information that is determined upon creating the V4 printer driver 303. The extension configurator 313, the configuration controller 323, the renderer 333, and the store device application 304 are capable of reading out various types of information from the DriverPropertyBag 410. However, the extension configurator 313, the configuration controller 323, the renderer 333, and the store device application 304 are incapable of writing information in the DriverPropertyBag 410.

The QueuePropertyBag 420 is a storage area for storing setting information for each logical printer (printer icon). The extension configurator 313 and the store device application 304 are capable of reading out various types of information from and writing various types of information in the QueuePropertyBag 420. Furthermore, the configuration controller 323 and the renderer 333 are capable of reading out various types of information from the QueuePropertyBag 420.

Note that a logical printer is, for example, a virtual printer that is displayed as a printer icon in a printer folder of the OS 302. For example, a user of the client device 10 can create, for a single image forming apparatus 20, a plurality of logical printers with respective different configurations (e.g., a document size, an orientation, and print quality).

The UserPropertyBag 430 is a storage area that stores, for each logical printer, setting information for each user. The extension configurator 313, the configuration controller 323, and the store device application 304 are capable of reading out various types of information from and writing various types of information in the UserPropertyBag 430.

Additionally, the extension configurator 313 and the renderer 333 are capable of reading out various types of information from and writing various types of information in an individual memory area 500.

The individual memory area 500 is implemented, for example, using a registry and a file. The individual memory area 500 is a storage area that is different from the PropertyBag 400. The individual memory area 500 is defined by a vendor that provides the V4 printer driver 303.

Due to the restriction applied by the OS 302, the store device application 304 is incapable of accessing a storage area other than the PropertyBag 400. Furthermore, the configuration controller 323 is incapable of accessing a storage area other than the DevmodePropertyBag and the PropertyBag 400, which are described above. Namely, the store device application 304 and the configuration controller 323 are incapable of reading out information from and writing information in the individual memory area 500.

This is the same as the restriction applied to the store application 311. For example, the restriction is for preventing the store device application 304 and the configuration controller 323 from adversely affecting the operation of the OS 302 by changing the registry, etc., used by the OS 302. Such a technique may be referred to as a sandbox.

<Display of Print Setting Screen after "Print" Button is Pressed>

Figure 6:
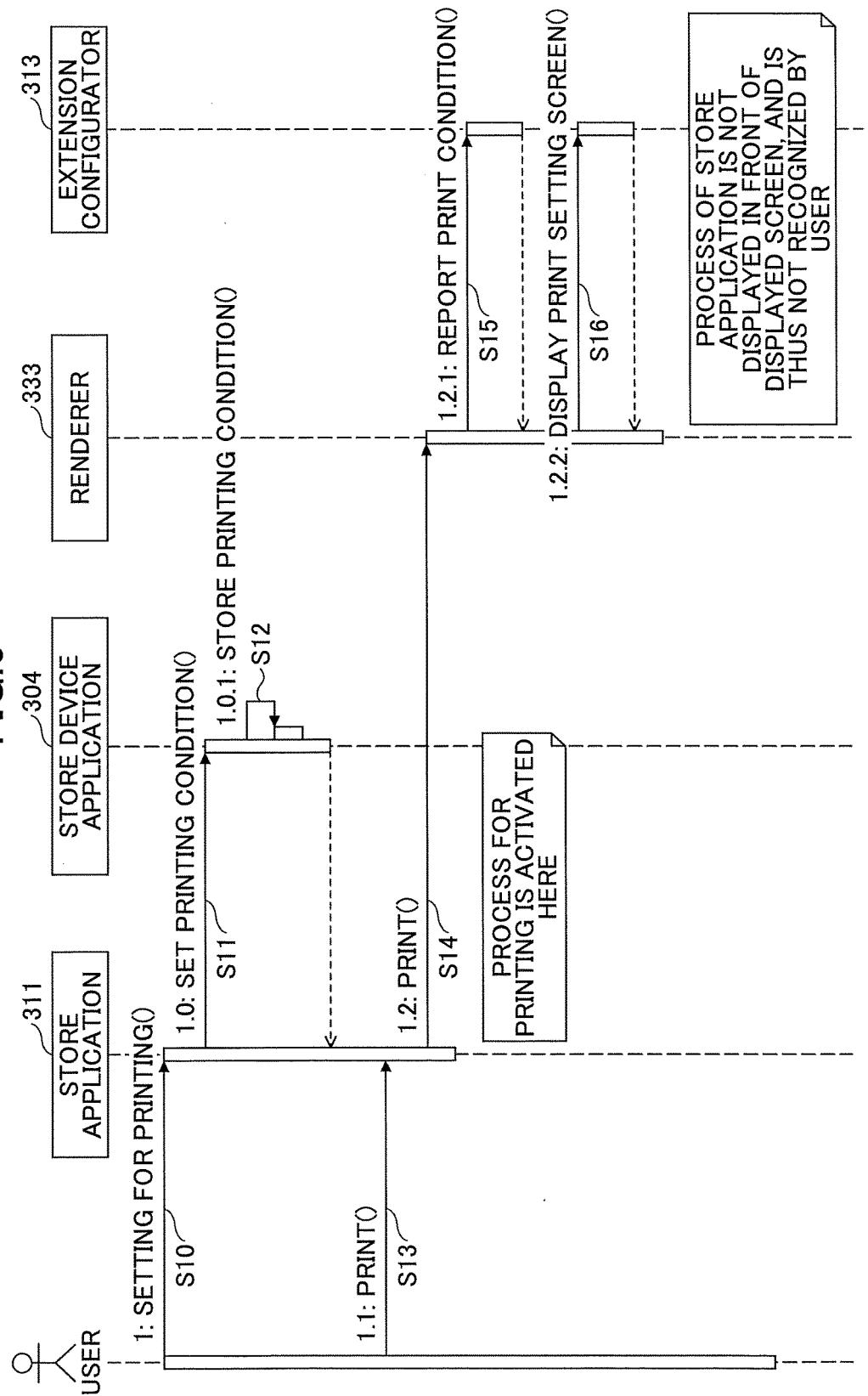
FIG. 6 is a sequence diagram of a process of a problem to be solved.

Next, by referring to FIG. 6, a description is given of the reason why a print setting screen cannot be displayed by the V4 printer driver 303 after a "print" button is pressed at the store application 311, that is a problem to be solved.

FIG. 6 is a sequence diagram of a process of a problem to be solved.

First, in step S10, the store application 311 is requested to make settings for printing, by the user.

Figure 7:
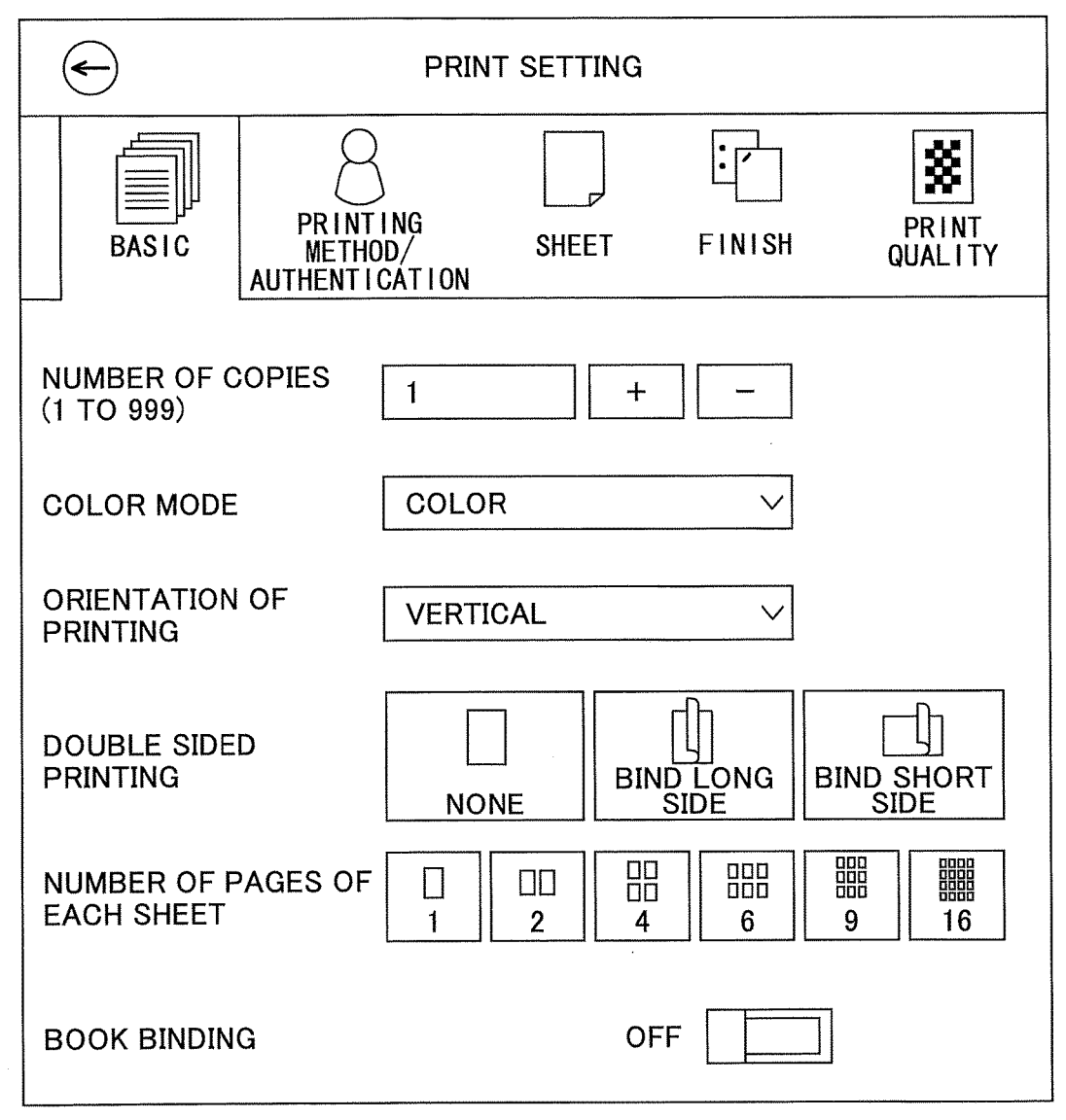

Subsequently, the store device application 304 displays the print setting screen and accepts a print setting operation (step S11). FIG. 7 is a diagram illustrating an example of the print setting screen displayed by the store device application 304.

Subsequently, the store device application 304 stores the setting (step S12).

As described above, in the case of printing from the store application 311, it is possible to display a print setting screen specific to a vendor by the store device application 304, before the print request is given by pressing the "print" button. However, at the time point before a print request is given, the renderer 333 cannot acquire the print target data from the OS 302. Therefore, it is not possible to use, for example, the processing result of the renderer 333, in the print setting screen before the print request is given.

Subsequently, the store application 311 accepts a print operation from the user (step S13). Here, for example, the user presses the "print" button of the store application 311.

Subsequently, the store application 311 requests the renderer 333 to print via the OS 302 (step S14). At this time, one or more print-use processes (for example, a process referred to as "FilterPipelineSvc"), which is a process of a program different from the process of the store application 311 presently displayed on the full screen, is activated by the OS 302. Here, the process executed by the V4 printer driver 303 is executed as a process of a program different from a so-called store application, which is an application downloaded from the "Windows store". Then, the process of the renderer 333 is executed by the one or more print-use processes.

Subsequently, the renderer 333 reports the data of the print setting (hereinafter also referred to as "printing condition"), to the extension configurator 313 (step S15).

Subsequently, the renderer 333 causes the extension configurator 313 to display a print setting screen (dialog) (step S16). Note that the print setting screen displayed in step S16 is different from the print setting screen displayed in step S11. The print setting screen displayed in step S16 is, for example, a screen that is to be displayed every time a printing process is performed, such as a setting screen of a password and the destination of fax transmission, and a screen including processing results by the renderer 333, such as a print preview screen, that is invoked only after the "print" button is pressed, due to restrictions applied by the OS 302. In this case, on the screen of the client device 10, the store application screen displaying the process of the store application 311 is displayed, and due to restrictions applied by the OS 302, the print setting screen displayed by the renderer 333 in the print-use process is not displayed in front of (before) the store application screen. That is, the print setting screen is of a process of a program different from the so-called store application, and therefore the print setting screen is not displayed in front of the screen displayed by the store application 311, due to the restrictions applied by the OS 302. For this reason, it is not known to the user that the print setting screen is displayed. Note that such a problem is caused, for example, when a print request is given from the store application 311 while the screen of the store application 311 is being displayed on the Modern UI of Windows 8, and when a print request is given from the store application 311 while the screen of the store application 311 is displayed in the tablet mode of Windows 10.

First Embodiment

<Functional Configuration—First Embodiment>

Figure 8:
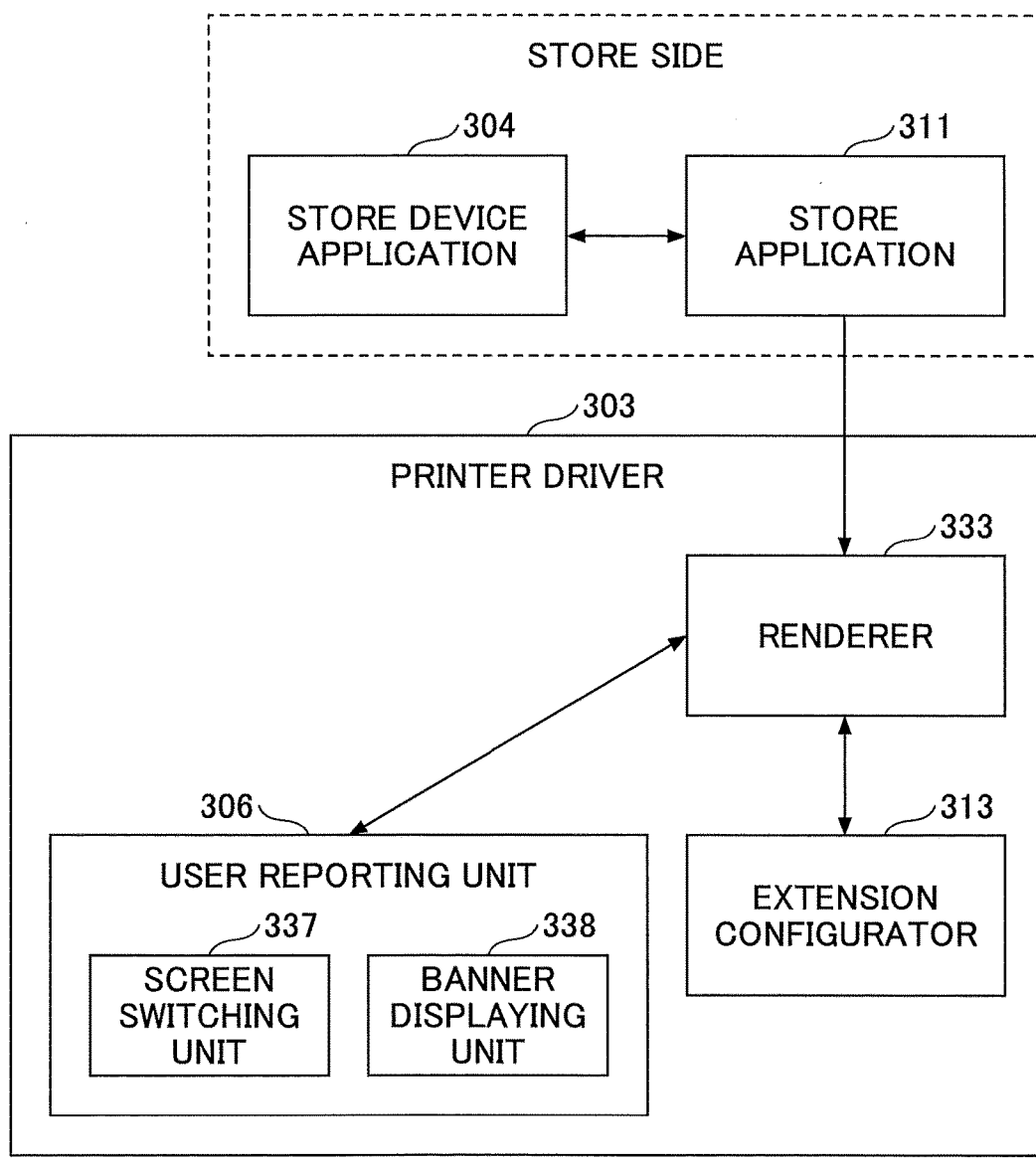
FIG. 8 is an example of a functional block diagram of the client device according to a first embodiment of the present invention.

Next, by referring to FIG. 8, the software (SW) configuration and functional configuration of the client device 10 according to the first embodiment will be described. FIG. 8 is an example of a functional block diagram of the client device 10 according to the first embodiment.

In the client device 10, the software items of the store application 311, the store device application 304, and the printer driver 303 are installed. The client device 10 includes the extension configurator 313, the renderer 333, and a user reporting unit 306.

The extension configurator 313, the renderer 333, and the user reporting unit 306 are implemented by processes executed by the CPU 106 of the client device 10 according to programs such as one or more of the printer drivers 303 installed in the client device 10.

In response to a print request from the store application 311 (an example of an "application"), the extension configurator 313 displays a print setting screen (an example of a "screen displaying information related to the print request"). Furthermore, the extension configurator 313 reports, to the renderer 333, the setting information corresponding to the setting operation accepted from the user.

The renderer 333 converts the print target data for which the print instruction has been given, into a format that can be processed by the image forming apparatus 20, based on the printing condition reported from the extension configurator 313.

Furthermore, the renderer 333 performs a rendering process on the print target data for which the printing instruction has been given at the store application 311, and creates a print preview image.

After the "print" button is pressed at the store application 311, the user reporting unit 306 makes it possible to display, to the user, items related to printing that cannot be displayed by the store device application 304, for example. In this case, the user reporting unit 306 displays, in front of the screen displayed by the store application 311, information indicating that there is a screen related to printing displayed by the extension configurator 313 of the printer driver 303.

Accordingly, after the "print" button is pressed at the store application 311, the user reporting unit 306 can display a screen that is to be displayed every time a printing process is performed, such as a setting screen of a password and the destination of fax transmission displayed by the extension configurator 313, and a screen including processing results by the renderer 333 such as a print preview screen.

The user reporting unit 306 includes a screen switching unit 337 and a banner displaying unit 338.

The screen switching unit 337 switches the display between the screen of the store application 311 and the screen displaying the print setting screen displayed by the extension configurator 313.

For example, the banner displaying unit 338 reports, in a screen of the store application 311, a message prompting to switch to the print setting screen displayed by the extension configurator 313, etc.

Process—First Embodiment

Next, by referring to FIG. 9, a process by the client device 10 according to the first embodiment will be described.

Figure 9:
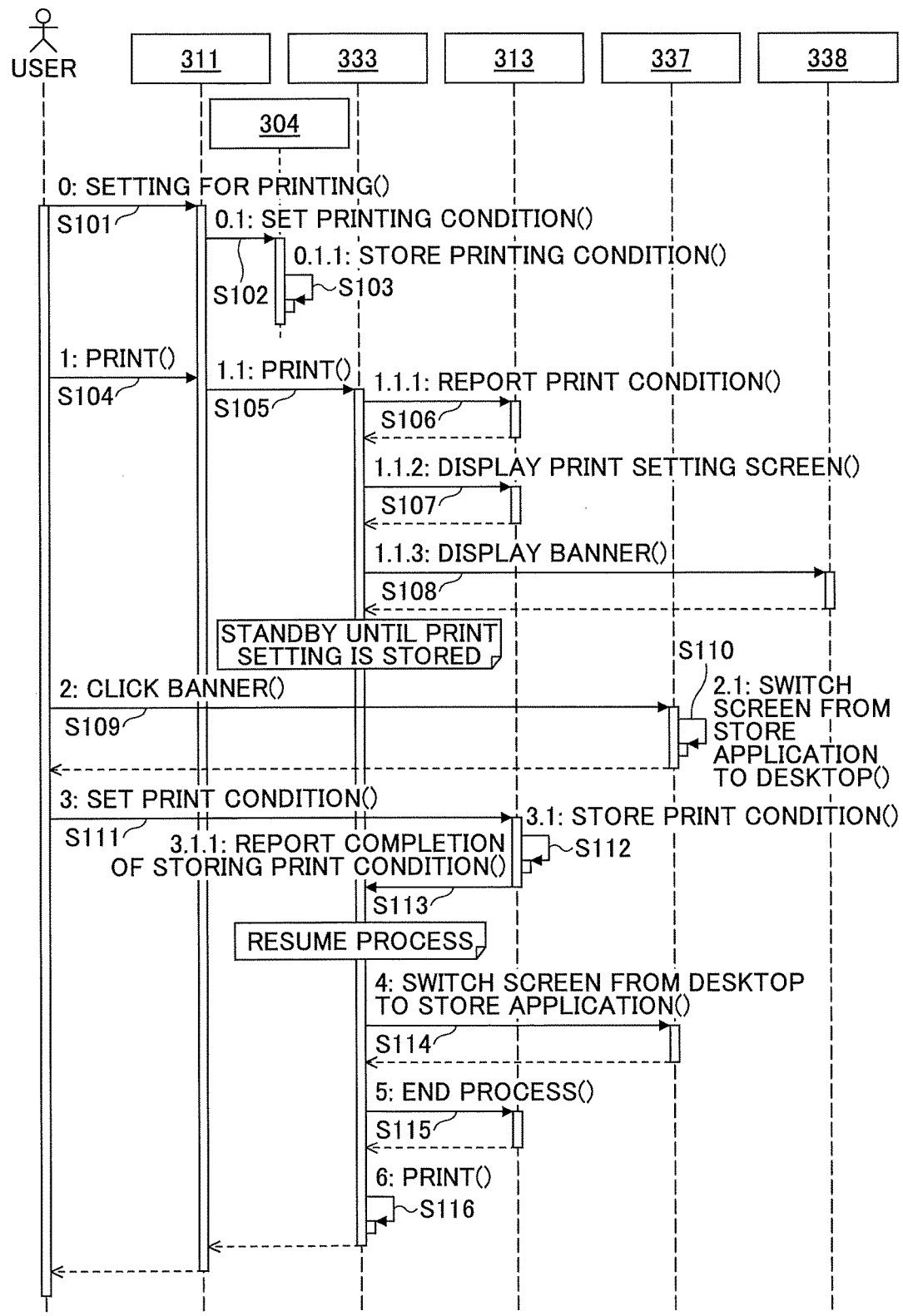
FIG. 9 is a sequence diagram of an example of a process by the client device according to the first embodiment of the present invention.

FIG. 9 is a sequence diagram of an example of a process by the client device 10 according to the first embodiment.

First, in step S101, the store application 311 receives a request to make settings of printing, from the user.

Subsequently, the store device application 304 displays the print setting screen and accepts a print setting operation (step S102). Accordingly, for example, items such as the number of print copies and color/monochrome are set.

Subsequently, the store device application 304 stores the setting (step S103).

Note that the processes of steps S101 through S103 are the same as the processes of steps S10 through S12 in FIG. 6, and it is not necessary to execute these processes when it is not necessary to set items such as the number of copies to be printed and color/monochrome.

Subsequently, the store application 311 accepts a print operation from the user (step S104). For example, the user presses the "print" button of the store application 311. Accordingly, the renderer 333, the extension configurator 313, and the user reporting unit 306 are activated by the OS 302, as processes of programs different from the process of the store application 311 presently being displayed on the full screen. Here, the processes of the renderer 333, the extension configurator 313, and the user reporting unit 306 are activated as processes of programs different from a so-called store application.

Subsequently, the store application 311 requests the renderer 333 to perform printing via the OS 302 (step S105).

Subsequently, the renderer 333 reports the data of printing conditions, to the extension configurator 313 (step S106). Here, the renderer 333 may report the items of printing conditions to be displayed on the print setting screen, to the extension configurator 313. In this case, the renderer 333 may report these items to the extension configurator 313, for example, via the individual memory area 500.

Subsequently, the renderer 333 causes the extension configurator 313 to display a print setting screen (step S107). Note that the process of displaying the print setting screen in step S107 may be executed by the renderer 333. In this case, the process of step S106 is unnecessary.

Here, the print setting screen is displayed by a process of a program that is different from the store application 311 that is presently displayed on the full screen, i.e., a process of a program that is different from a so-called store application. Therefore, due to restrictions applied by the OS 302, the print setting screen is not displayed in front of the screen displayed by the store application 311. For example, the print setting screen is displayed on the desktop side screen on which the screen of the desktop application 321 is displayed, due to restrictions applied by the OS 302, and the print setting screen is not displayed in front of the store application screen displayed by the process of the store application 311. For this reason, the user cannot recognize that the print setting screen is displayed.

Subsequently, the renderer 333 causes the banner displaying unit 338 to display a banner (toast) prompting to switch the screen from the screen of the store application 311 to the screen of the desktop side (step S108). Here, the renderer 333 waits until a report indicating that the printing conditions have been stored, is received from the extension configurator 313. For example, when a printing process is performed according to print settings, the process is temporarily stopped. Furthermore, for example, in the case of displaying the print preview screen, and the renderer 333 does not wait for print settings to be input from the user, the process does not need to be temporarily stopped. Note that when printing is performed when the "print" button is pressed in the print preview screen, the process may be temporarily stopped.

Figure 10:
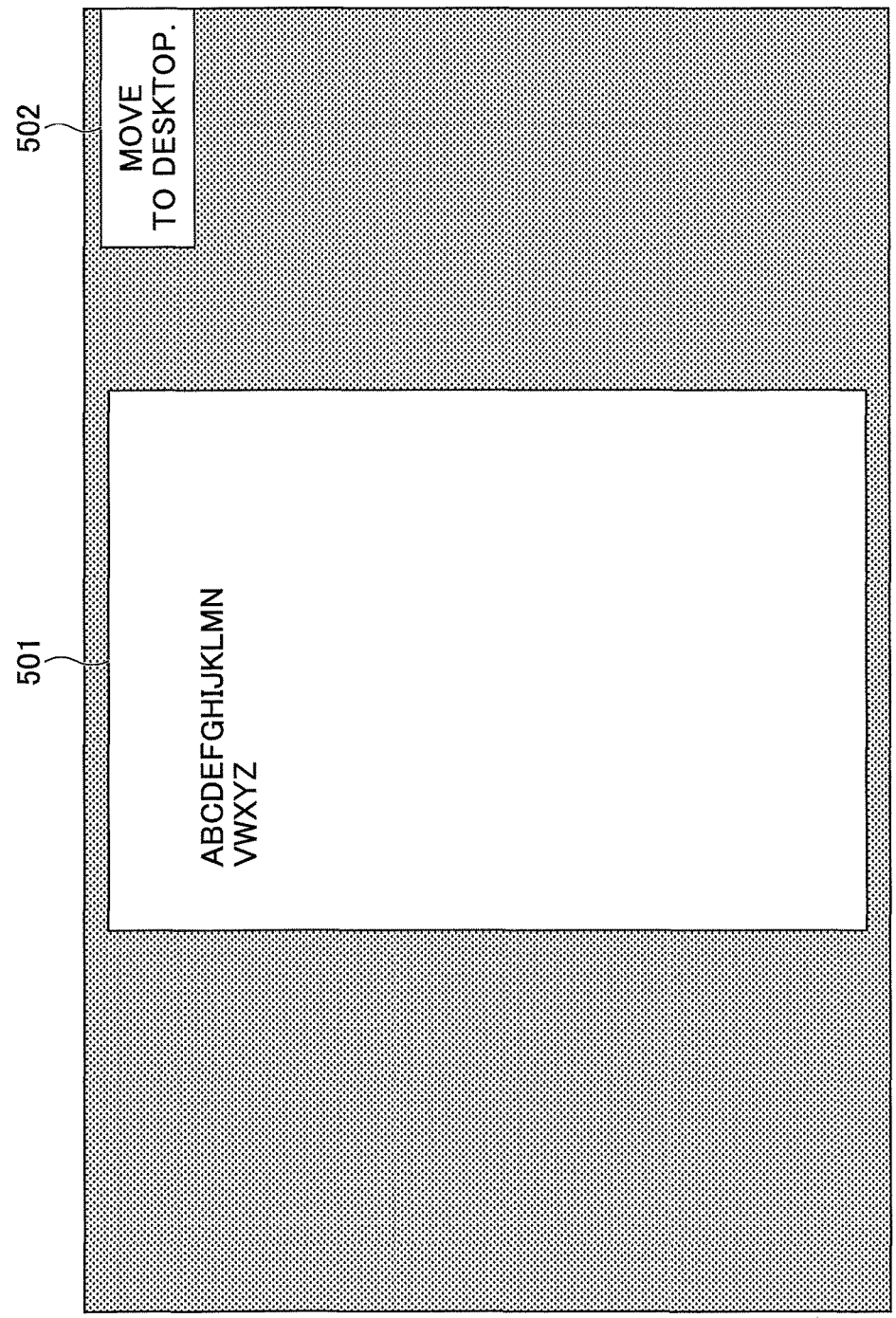
FIG. 10 is a diagram illustrating an example of a banner display according to the first embodiment of the present invention.

FIG. 10 is a diagram illustrating an example of a banner display. When the store application 311 is displayed on the full screen on a screen 501, for example, the toast function of Windows is used to display a banner 502. As long as the banner is a reporting screen displayed in front of the screen of the store application 311, the banner is not limited to the toast function of Windows.

Subsequently, the screen switching unit 337 accepts an operation such as clicking a banner, from the user (step S109).

Subsequently, the screen switching unit 337 switches the screen from the display screen of the store application 311 to the screen of the desktop side (step S110). Accordingly, the print setting screen displayed by the extension configurator 313 in step S107 is displayed on the foreground. Note that the user may perform an operation on the OS 302 to switch the screen from the screen of the store application 311 to the screen of the desktop side.

Figure 11:
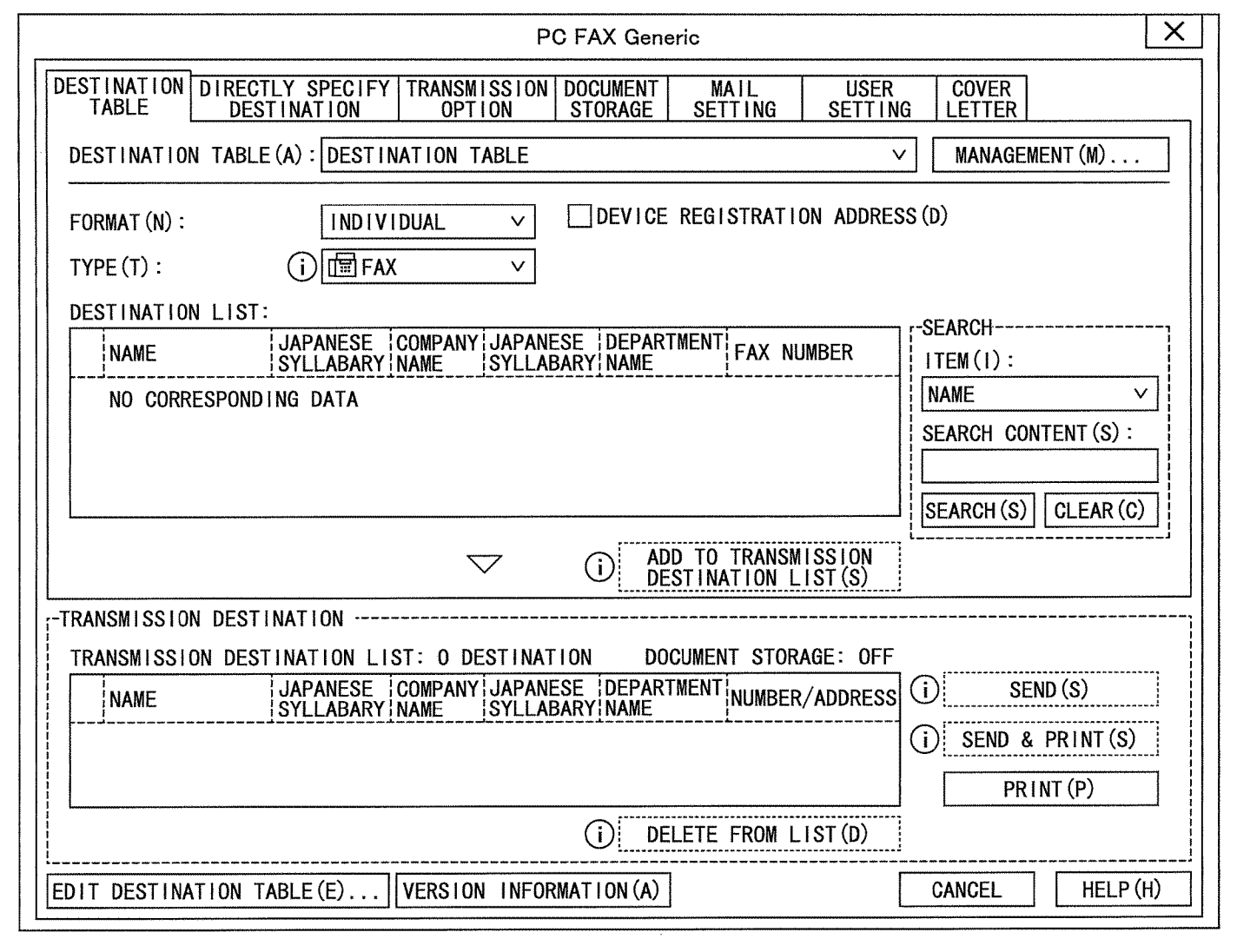

FIG. 11 is a diagram illustrating an example of a print setting screen used when setting a destination and a password, etc. FIG. 11 illustrates an example of a print setting screen when FAX transmission is performed after a destination and a password are set by the user.

Figure 12:
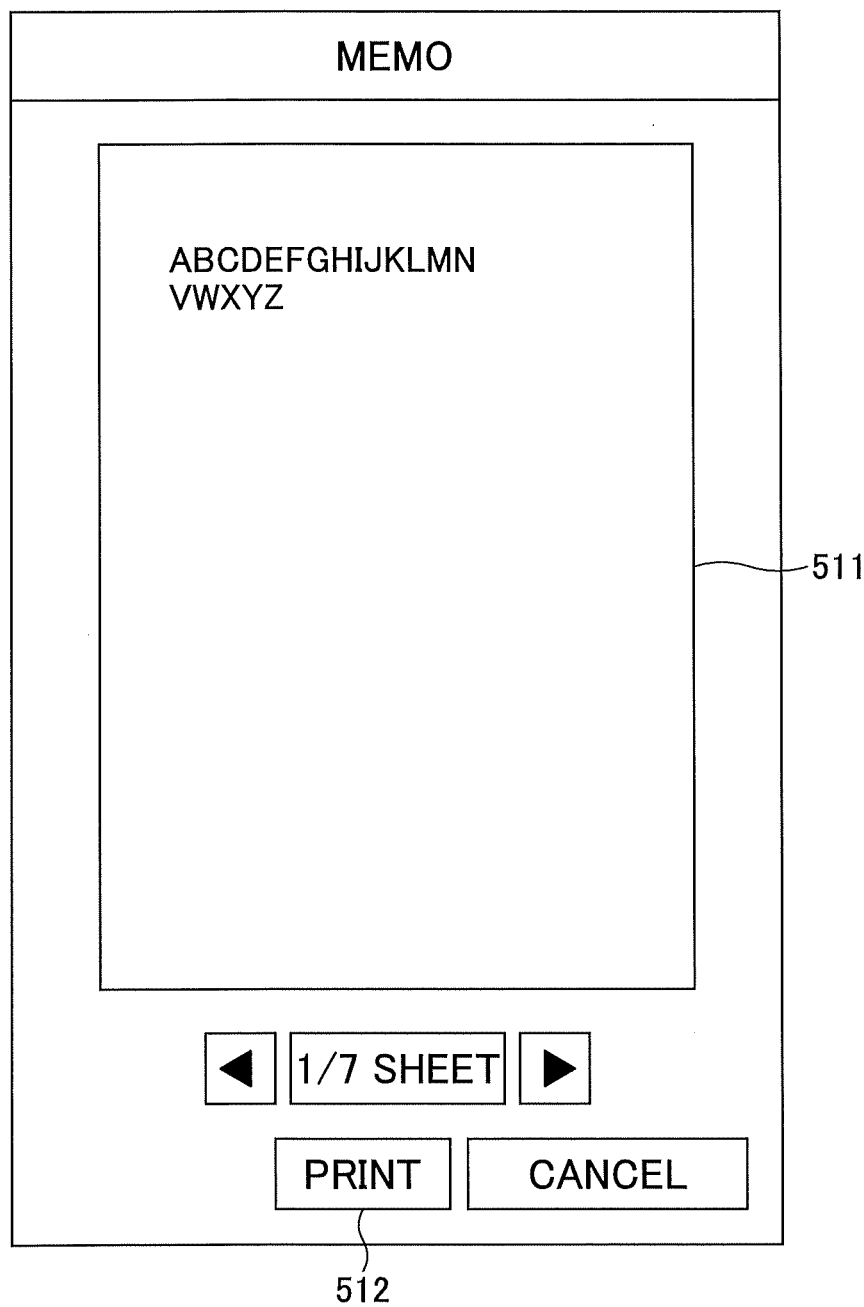
FIG. 12 is a diagram illustrating an example of a print setting screen when print preview is displayed according to the first embodiment of the present invention.

FIG. 12 is a diagram illustrating an example of a print setting screen when print preview is displayed. In FIG. 12, after the user confirms an image 511 to be printed in the print preview, and presses a "print" button 512, printing is performed.

Here, in step S110, the screen switching unit 337 stores the identification information of the screen of the store application 311 (for example, a Window handle, an example of "identification information of a screen of an application"). Specifically, for example, the screen switching unit 337 acquires a Window handle of the screen presently displayed by the user, by making a request to the OS 302 by using an API function "GetForegroundWindow", and stores the acquired Window handle as identification information. Accordingly, after accepting an operation from the user at the print setting screen, the screen of the store application 311 can be displayed on the forefront.

Subsequently, the extension configurator 313 accepts the setting of printing from the user (step S111).

Subsequently, the extension configurator 313 stores the accepted print setting (step S112). Note that the data of the print setting may be reported to the renderer 333, for example, via the individual memory area 500, etc.

Subsequently, the extension configurator 313 reports to the renderer 333 that the printing conditions have been stored (step S113). At this time, the data of the print setting is reported from the extension configurator 313 to the renderer 333. In this way, in step S106, the renderer 333 invokes the extension configurator 313 and transfers the printing conditions directly to the extension configurator 313. In step S113, the extension configurator 313 returns the printing conditions that have been changed or added, directly to the renderer 333. Here, the renderer 333 resumes the printing process upon receiving the report that the printing conditions have been stored, from the extension configurator 313.

Subsequently, the renderer 333 causes the screen switching unit 337 to switch the screen from the screen of the desktop side to the screen of the store application 311 (step S114). Here, the screen switching unit 337 displays the screen of the store application 311 on the foreground, by using the identification information of the screen of the store application 311 stored in step S110.

Subsequently, the renderer 333 ends the processes of the extension configurator 313 and the user reporting unit 306 activated in step S104 (step S115).

Subsequently, the renderer 333 generates print data in a format that can be processed by the image forming apparatus 20, based on the printing conditions stored in steps S103 and S112, and requests the image forming apparatus 20 to perform a printing process (step S116).

Modified Example

The banner displaying unit 338 may display a report by using, for example, a chat function as the banner, instead of using the toast function of Windows as the banner. Anything may be used as the banner as long as the banner is displayed in front of the screen of the store application 311. For example, a report may be output to the user by voice sound, etc.

Furthermore, the screen switching unit 337 may display the print setting screen at the front side, for example, by minimizing the screen of the store application 311 or displaying the screen of the store application 311 on the rearmost side. Alternatively, the user may perform an operation on the OS 302 to emulate the operation of switching the screen from the screen of the store application 311 to the screen of the desktop side, and display the print setting screen at the front side.

Second Embodiment

In the first embodiment, an example in which the extension configurator 313, the renderer 333, and the user reporting unit 306 are implemented by the printer driver 303 has been described. In a second embodiment, an example in which the user reporting unit 306 is implemented by an executable file (for example, an EXE file) different from the printer driver 303, will be described. Accordingly, a common user reporting unit 306 can be used by a plurality of printer drivers 303. Note that the second embodiment is the same as the first embodiment except for some portions, and therefore redundant descriptions are appropriately omitted. Hereinafter, the difference points between the second embodiment and the first embodiment will be described.

Functional Configuration—Second Embodiment

Figure 13:
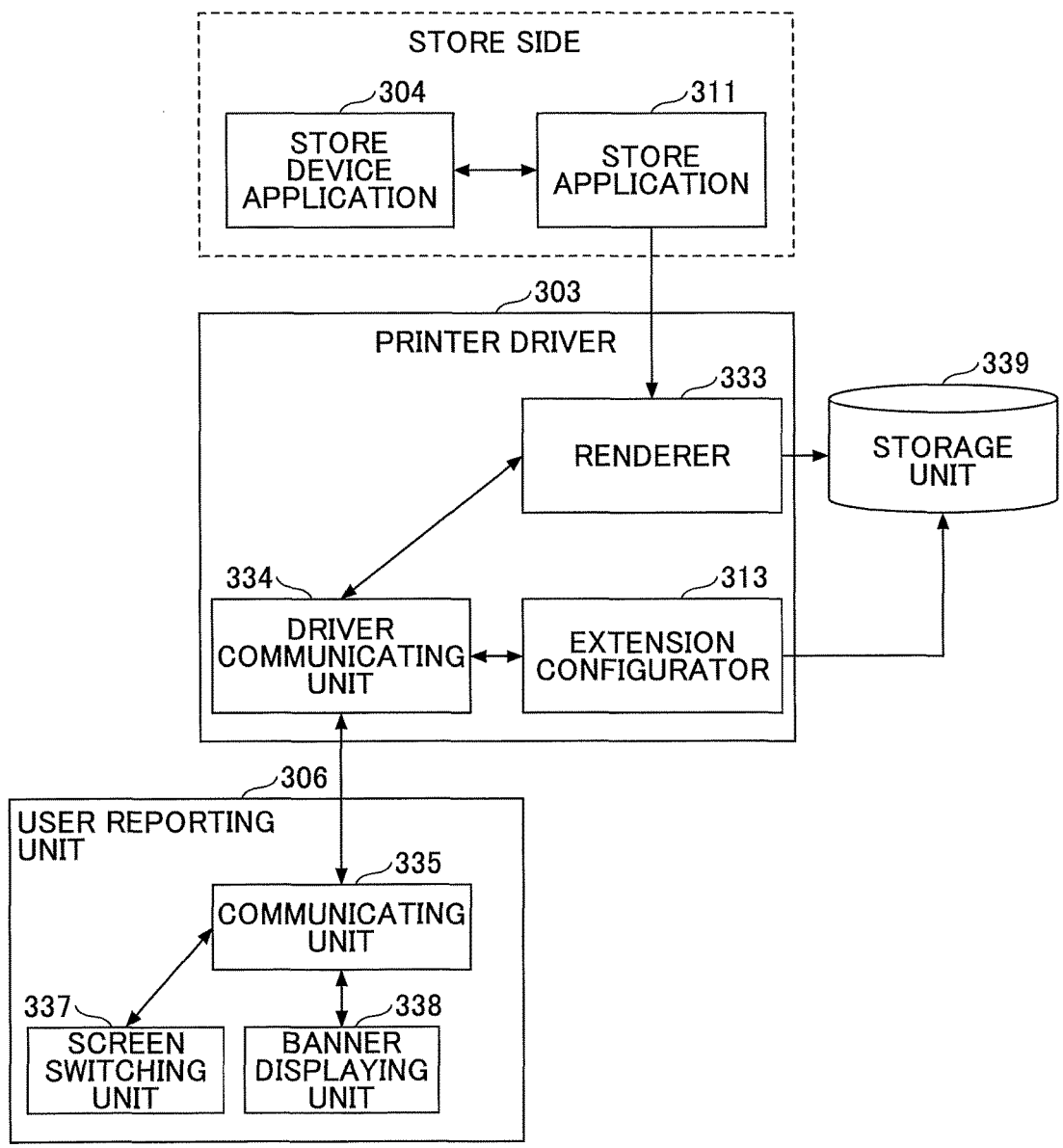
FIG. 13 is an example of a functional block diagram of the client device according to a second embodiment of the present invention.

By referring to FIG. 13, the functional configuration of the client device 10 according to the second embodiment will be described. FIG. 13 is an example of a functional block diagram of the client device 10 according to the second embodiment.

The client device 10 according to the second embodiment further includes a driver communicating unit 334. The driver communicating unit 334 is implemented by processes executed by the CPU 106 of the client device 10 according to programs such as one or more of the printer drivers 303 installed in the client device 10.

The client device 10 according to the second embodiment further includes a communicating unit 335 in the user reporting unit 306.

The client device 10 according to the second embodiment further includes a storage unit 339. The storage unit 339 is implemented by using, for example, the HDD 251, etc.

The storage unit 339 stores data such as the individual memory area 500 described above.

The extension configurator 313 and the renderer 333 according to the second embodiment communicate with the user reporting unit 306 via the driver communicating unit 334 and the communicating unit 335. Communication between the driver communicating unit 334 and the communicating unit 335 may be performed by, for example, inter-process communication.

The user reporting unit 306 may be automatically activated when the OS 302 is activated, and be resident in the client device 10, by being implemented as a service of Windows, for example. Alternatively, the user reporting unit 306 may be activated by an operation by the user, and be resident in the client device 10.

Alternatively, the user reporting unit 306 may be activated at the time of printing, and may be ended when the printing is completed. In this case, the end of the process of the user reporting unit 306 may be ended by an instruction of the printer driver 303, or may be ended by a process of the user reporting unit 306. Furthermore, for example, when there are a plurality of print jobs, and when the process of the user reporting unit 306 has already been activated, double activation may be prevented by the determination of the printer driver 303 or the process of the user reporting unit 306.

Process—Second Embodiment

Next, by referring to FIG. 14, a process by the client device 10 according to the second embodiment will be described.

Figure 14:
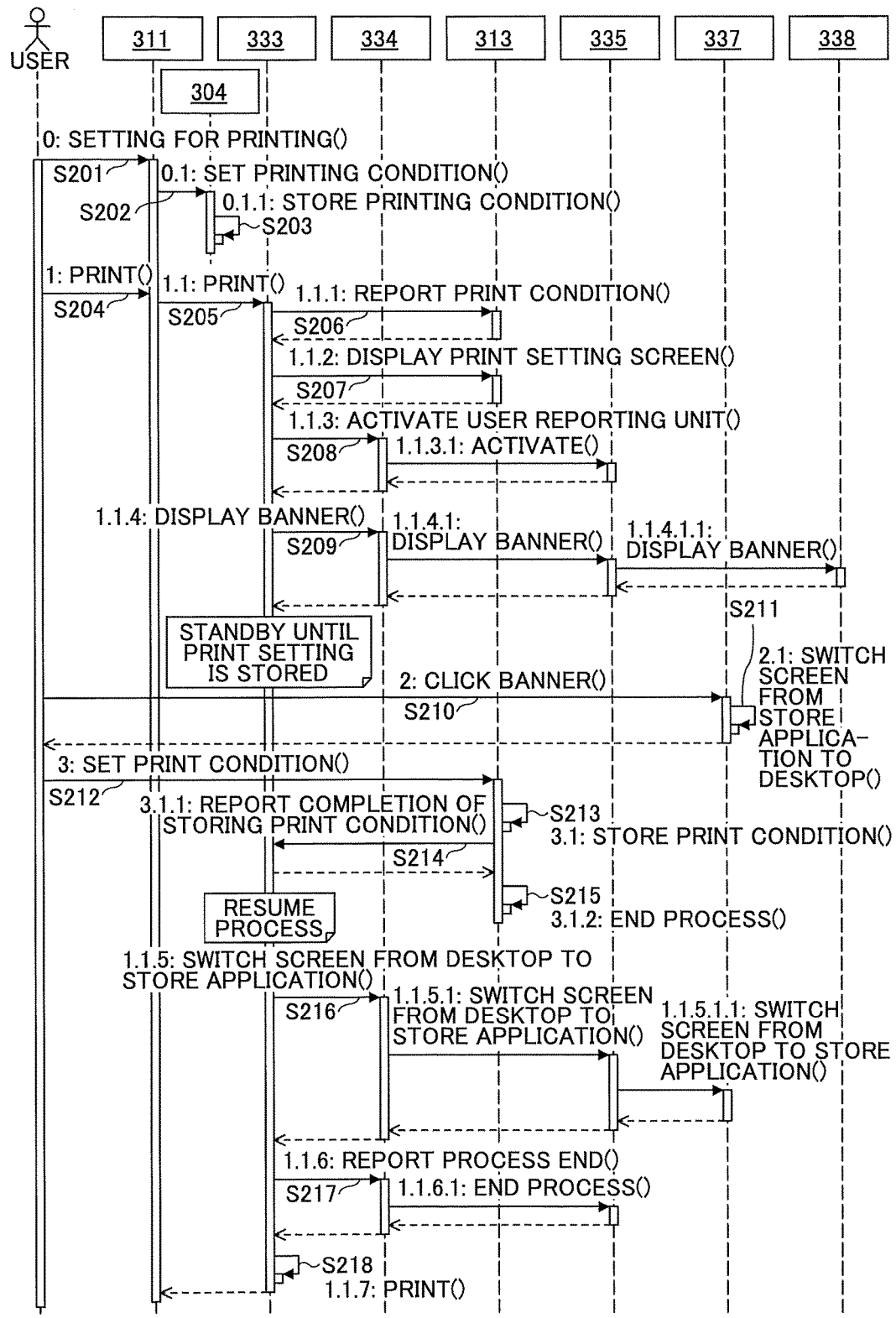
FIG. 14 is a sequence diagram of an example of a process by the client device according to the second embodiment of the present invention.

FIG. 14 is a sequence diagram of an example of a process by the client device 10 according to the second embodiment.

In the following, an example will be described, in which the process of the user reporting unit 306 is activated from the printer driver 303 at the time of printing, and is ended from the printer driver 303 when the printing has ended.

The processes of steps S201 through S207 are the same as the processes of steps S101 through S107 of FIG. 9. Note that in step S206, the renderer 333 may report the printing conditions to the extension configurator 313, for example, by inter-process communication. Alternatively, the renderer 333 may report the printing conditions to the extension configurator 313 via the storage unit 339. In the case of reporting the printing conditions via the storage unit 339, an address set in advance may be used as the address (path) of the area where the printing conditions are stored in the storage unit 339. Alternatively, the address may be reported from the renderer 333 to the extension configurator 313, for example, by inter-process communication.

In step S208, the renderer 333 activates the process of the user reporting unit 306. Here, the renderer 333 determines whether the user reporting unit 306 has already been activated, and when the user reporting unit 306 has been activated, the renderer 333 does not activate the user reporting unit 306. In this case, for example, the renderer 333 acquires, from the OS 302, a list of names of processes that are already activated. When the process name of the user reporting unit 306 that is to be activated, is included in the list, the renderer 333 may determine that the user reporting unit 306 has already been activated.

Alternatively, the renderer 333 may activate the process of the user reporting unit 306, and immediately after the activation, the user reporting unit 306 may determine whether a process, which has the same process name as the process of the user reporting unit 306, has already been activated. When such a process has already been activated, the user reporting unit 306 may end the process of the user reporting unit 306.

The processes of steps S209 through S214 are the same as the processes of steps S108 through 113 of FIG. 9. Note that in step S214, the extension configurator 313 may report the printing conditions to the renderer 333, for example, by inter-process communication. Alternatively, the extension configurator 313 may report the printing conditions to the renderer 333 via the storage unit 339. In the case of reporting the printing conditions via the storage unit 339, an address set in advance may be used as the address of the area where the printing conditions are stored in the storage unit 339. Alternatively, the address may be reported from the extension configurator 313 to the renderer 333, for example, by inter-process communication.

In step S215, the extension configurator 313 ends the process of the extension configurator 313.

Subsequently, the renderer 333 causes the screen switching unit 337 to switch the screen from the screen of the desktop side to the screen of the store application 311 (step S216).

Subsequently, the renderer 333 ends the process of the user reporting unit 306 activated in step S208 (step S217).

Subsequently, the renderer 333 generates print data in a format that can be processed by the image forming apparatus 20, based on the printing conditions stored in steps S203 and S213, and requests the image forming apparatus 20 to perform a printing process (step S218).

Accordingly, the print setting screen displayed by the extension configurator 313 can be changed according to each printer driver 303. Furthermore, a plurality of printer drivers 303 can use a common user reporting unit 306, and therefore it is possible to reduce the size of the data to be distributed by the package of each printer driver 303.

Third Embodiment

In the first embodiment and the second embodiment, an example in which the extension configurator 313, which is implemented by the printer driver 303, displays the print setting screen after the "print" button is pressed in the store application 311, has been described.

In a third embodiment, the user reporting unit 306 is implemented by a different executable file (for example, an EXE file), from the printer driver 303. Furthermore, the user reporting unit 306 further includes an additional setting unit 340 that displays the print setting screen after the "print" button is pressed at the store application 311. Accordingly, a common print setting screen can be displayed after the "print" button is pressed in the store application 311, with respect to a plurality of printer drivers 303. Note that the third embodiment is the same as the first or second embodiment except for some portions, and therefore redundant descriptions are appropriately omitted. Hereinafter, the difference points between the third embodiment and the second embodiment will be described.

Functional Configuration—Third Embodiment

Figure 15:
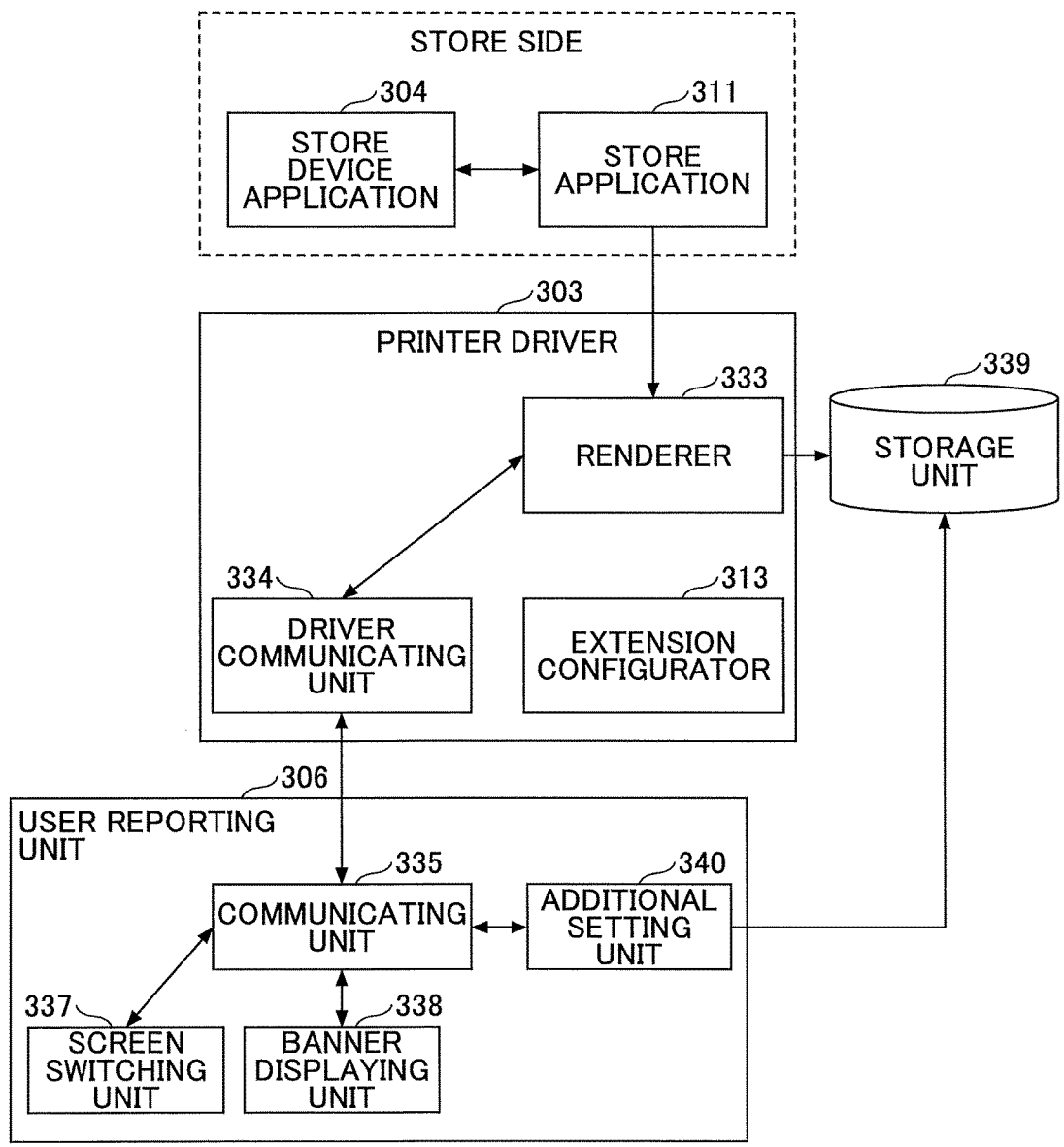
FIG. 15 is an example of a functional block diagram of the client device according to a third embodiment of the present invention.

By referring to FIG. 15, the functional configuration of the client device 10 according to the third embodiment will be described. FIG. 15 is an example of a functional block diagram of the client device 10 according to the third embodiment.

The client device 10 according to the third embodiment further includes the additional setting unit 340 in the user reporting unit 306.

After the "print" button is pressed at the store application 311, the additional setting unit 340 displays a screen that is to be displayed every time a printing process is performed, such as a setting screen of a password and the destination of fax transmission, and a screen including processing results by the renderer 333 such as a print preview screen.

Note that the extension configurator 313 according to the third embodiment displays a print setting screen specific to a vendor, only when printing is performed from the desktop application 321. After the "print" button is pressed at the store application 311, the extension configurator 313 does not display a print setting screen specific to a vendor.

Process—Third Embodiment

Next, by referring to FIG. 16, a process by the client device 10 according to the third embodiment will be described.

Figure 16:
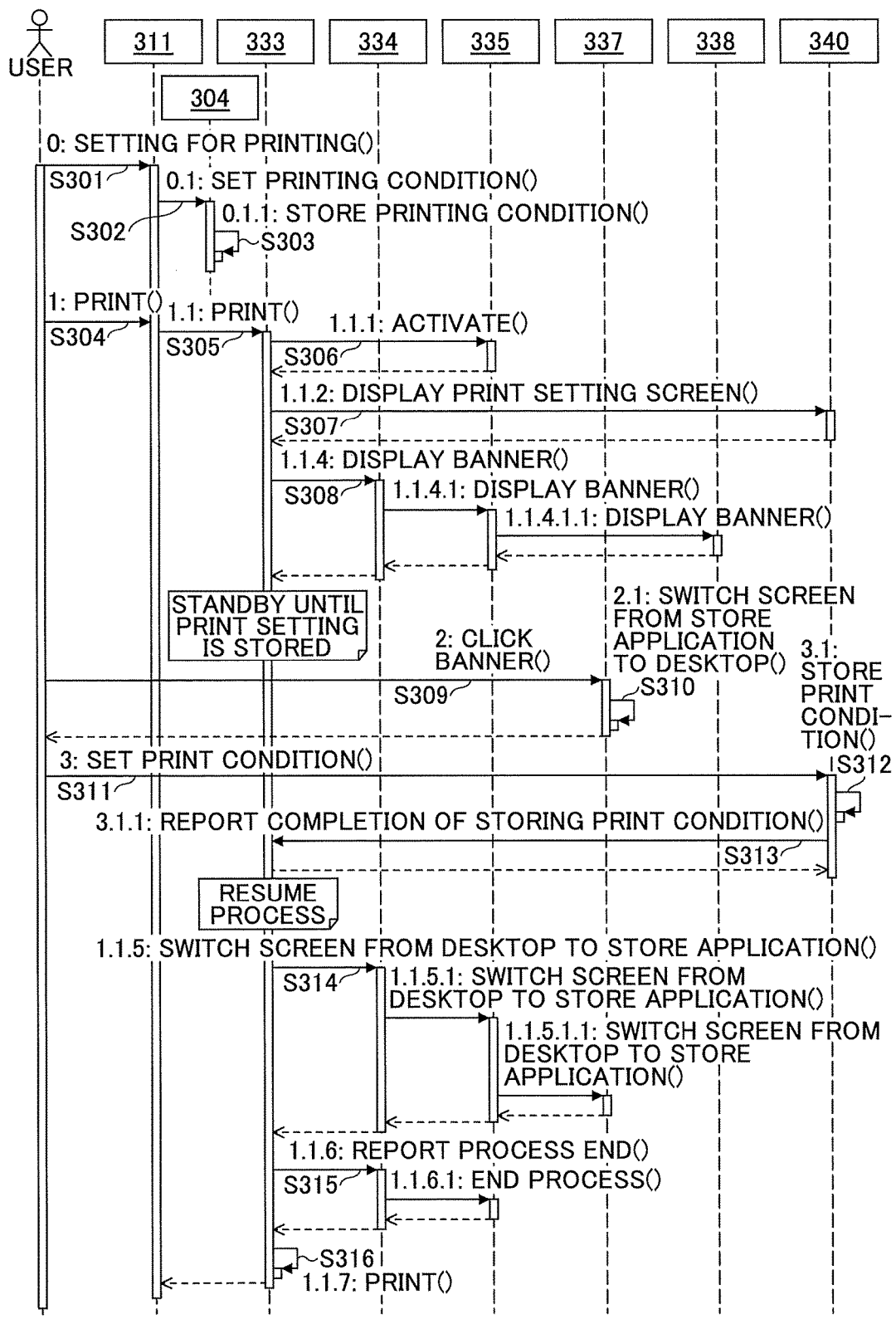
FIG. 16 is a sequence diagram of an example of a process by the client device according to the third embodiment of the present invention.

FIG. 16 is a sequence diagram of an example of a process by the client device 10 according to the third embodiment.

The processes of steps S301 through S305 are the same as the processes of steps S201 through S205 of FIG. 14.

In step S306, the renderer 333 activates the process of the user reporting unit 306. Note that at this time, the data of the printing conditions may be reported from the renderer 333 to the additional setting unit 340.

Subsequently, the renderer 333 causes the additional setting unit 340 to display a print setting screen (step S307).

The processes of steps S308 through S310 are the same as the processes of steps S209 and S210 of FIG. 14.

In step S311, the additional setting unit 340 accepts a setting of printing from the user.

Subsequently, the additional setting unit 340 stores the accepted print setting (step S312). Subsequently, the additional setting unit 340 reports to the renderer 333 that the printing conditions have been stored (step S313).

The processes of steps S314 and S315 are the same as the processes of steps S216 and S217 of FIG. 14.

In step S316, the renderer 333 generates print data in a format that can be processed by the image forming apparatus 20, based on the printing conditions stored in steps S303 and S312, and requests the image forming apparatus 20 to perform a printing process.

<Overview>

According to the above-described embodiments, when a print request is given from an application for which a screen is displayed in front of a screen related to printing, the screen related to printing is displayed, and a report indicating the switch to the screen related to printing, is displayed in the screen of the application.

Thus, when a print operation is performed at the store application, it is possible to report to the user that the screen related to printing has been displayed. Furthermore, it is possible to display a screen that is to be displayed every time a printing process is performed, such as a setting screen of a password and the destination of fax transmission, and a screen including processing results by the renderer 333 such as a print preview screen.

Note that in the above description, the store application 311 is described as an example. However, the above-described embodiments are applicable to an application by which a screen related to printing will not displayed at the forefront by the printer driver 303, after the print button is pressed.

According to one embodiment of the present invention, it is possible to report, to the user, of the existence of a screen for accepting settings related to printing, after an operation for executing printing is performed by the user at an application.

The information processing apparatus, the information processing method, and the information processing system are not limited to the specific embodiments described in the detailed description, and variations and modifications may be made without departing from the spirit and scope of the present invention.

What is claimed is:

1. An information processing apparatus comprising a processor, in communication with a memory, executing a process including:
    displaying, on a display device, a screen displaying information relating to a print request, in response to the print request received from an application, the print request being given in response to an operation input to the application via a user interface; and
    displaying a report indicating switching to the screen displaying the information relating to the print request, in a status where a screen displayed by the application is displayed in front of and hiding the screen displaying the information relating to the print request, the report being displayed in front of the screen displayed by the application,
    wherein the process further includes:
    switching from the screen displayed by the application to the screen displaying the information relating to the print request, in response to an operation performed in response to the report,
    wherein the switching includes switching from the screen displaying the information relating to the print request to the screen displayed by the application, in response to a setting operation performed in the screen displaying the information relating to the print request, and
    wherein the switching includes:
    storing identification information of the screen displayed by the application; and
    switching from the screen displaying the information relating to the print request to the screen displayed by the application, based on the identification information.

2. The information processing apparatus according to claim 1, wherein the process further includes:
    performing a rendering process based on data of a print target, in response to the print request received from the application, wherein
    the displaying includes displaying the screen displaying the information relating to the print request including a result of the rendering process.

3. The information processing apparatus according to claim 1, wherein
    the application is a store application, and
    the displaying is performed by a Version 4 printer driver.

4. The information processing apparatus according to claim 1, wherein the switching switches from the screen displayed by the application to a screen displaying a setting screen to set at least one of password and address for the print request.

5. An information processing method executed by a computer, the information processing method comprising:
    displaying, on a display device, a screen displaying information relating to a print request, in response to the print request received from an application, the print request being given in response to an operation input to the application via a user interface; and
    displaying a report indicating switching to the screen displaying the information relating to the print request, in a status where a screen displayed by the application is displayed in front of and hiding the screen displaying the information relating to the print request, the report being displayed in front of the screen displayed by the application, wherein the method further includes:

switching from the screen displayed by the application to the screen displaying the information relating to the print request, in response to an operation performed in response to the report, wherein the switching includes switching from the screen displaying the information relating to the print request to the screen displayed by the application, in response to a setting operation performed in the screen displaying the information relating to the print request, and wherein the switching includes:

storing identification information of the screen displayed by the application; and switching from the screen displaying the information relating to the print request to the screen displayed by the application, based on the identification information.

6. An information processing system comprising:

an information processing apparatus including a processor, in communication with a memory, executing a process including:

displaying, on a display device, a screen displaying information relating to a print request, in response to the print request received from an application, the print request being given in response to an operation input to the application via a user interface;

displaying a report indicating switching to the screen displaying the information relating to the print request, in a status where a screen displayed by the application is displayed in front of and hiding the screen displaying the information relating to the print request, the report being displayed in front of the screen displayed by the application; and sending data of a print target corresponding to the print request, wherein the information processing system further comprises:

an image forming apparatus including a processor, in communication with a memory, executing a process including:

receiving the data of the print target from the infatuation processing apparatus; and forming an image based on the received data, wherein the process further includes:

switching from the screen displayed by the application to the screen displaying the information relating to the print request, in response to an operation performed in response to the report, wherein the switching includes switching from the screen displaying the information relating to the print request to the screen displayed by the application, in response to a setting operation performed in the screen displaying the information relating to the print request, and wherein the switching includes:

storing identification information of the screen displayed by the application; and switching from the screen displaying the information relating to the print request to the screen displayed by the application, based on the identification information.

\* \* \* \* \*